US009784189B2

(12) United States Patent
Wicks

(10) Patent No.: US 9,784,189 B2
(45) Date of Patent: Oct. 10, 2017

(54) METHOD AND SYSTEM FOR AN ENGINE VARIABLE CHARGE MOTION SYSTEM

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 14/607,908

(22) Filed: Jan. 28, 2015

(65) Prior Publication Data

US 2016/0215704 A1     Jul. 28, 2016

(51) Int. Cl.
| | | |
|---|---|---|
| *F02M 35/10* | (2006.01) | |
| *F02D 9/18* | (2006.01) | |
| *F02B 31/06* | (2006.01) | |
| *F02B 27/02* | (2006.01) | |
| *F02D 41/00* | (2006.01) | |

(52) U.S. Cl.
CPC ............... *F02D 9/18* (2013.01); *F02B 31/06* (2013.01); *F02D 41/0002* (2013.01); *F02M 35/10091* (2013.01); *F02M 35/10373* (2013.01); *F02B 27/0294* (2013.01); *F02D 41/008* (2013.01); *F02D 2041/0015* (2013.01); *F02M 35/10072* (2013.01); *F02M 35/10242* (2013.01); *F02M 35/10262* (2013.01); *F02M 35/10301* (2013.01); *Y02T 10/146* (2013.01); *Y02T 10/42* (2013.01)

(58) Field of Classification Search
CPC ....... F02M 35/10242; F02M 35/10262; F02M 35/10301; F02M 35/10072; F02D 9/18; F02B 27/0294
USPC ..................................................... 123/184.56
See application file for complete search history.

(56) References Cited

U.S. PATENT DOCUMENTS

| | | | |
|---|---|---|---|
| 4,213,437 A | 7/1980 | Onofrio | |
| 4,928,638 A | 5/1990 | Overbeck | |
| 5,165,374 A * | 11/1992 | Chapman | F02B 31/06 123/308 |
| 6,289,864 B1 * | 9/2001 | Vide | F02B 31/04 123/184.56 |
| 6,877,478 B2 | 4/2005 | Kim et al. | |
| 7,281,512 B2 * | 10/2007 | Marentette | F02B 27/02 123/184.21 |
| 7,980,228 B2 | 7/2011 | Peters et al. | |
| 2013/0111901 A1 | 5/2013 | Leone et al. | |

FOREIGN PATENT DOCUMENTS

WO          9203645         3/1992

* cited by examiner

*Primary Examiner* — Jacob Amick
*Assistant Examiner* — Charles Brauch
(74) *Attorney, Agent, or Firm* — Julia Voutyras; McCoy Russell LLP

(57) ABSTRACT

Methods and systems are provided for introducing a charge motion to a cylinder via a bladder in an intake manifold runner. In one example, a system may include positioning a bladder in an intake port proximate to a cylinder.

3 Claims, 10 Drawing Sheets

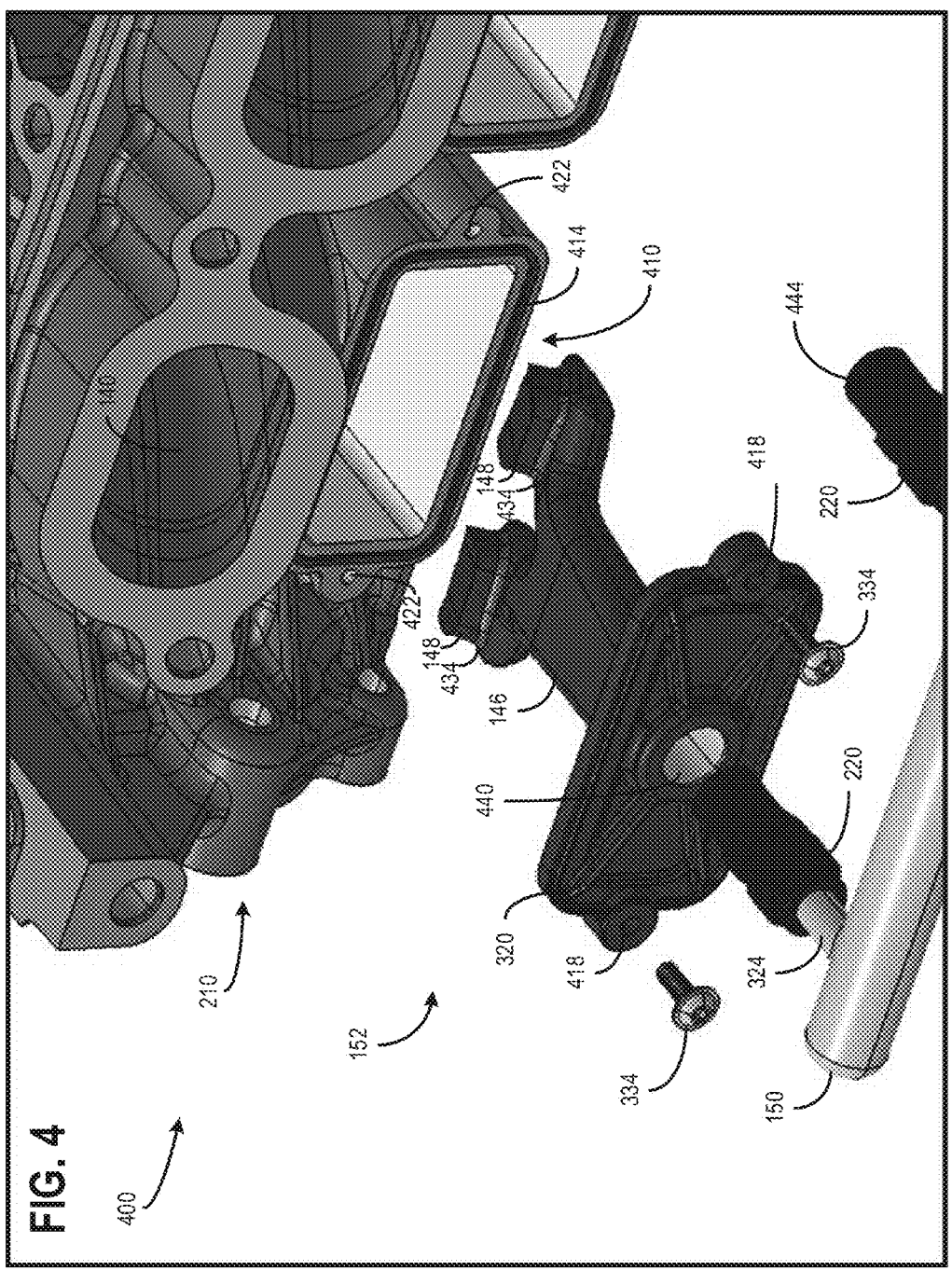

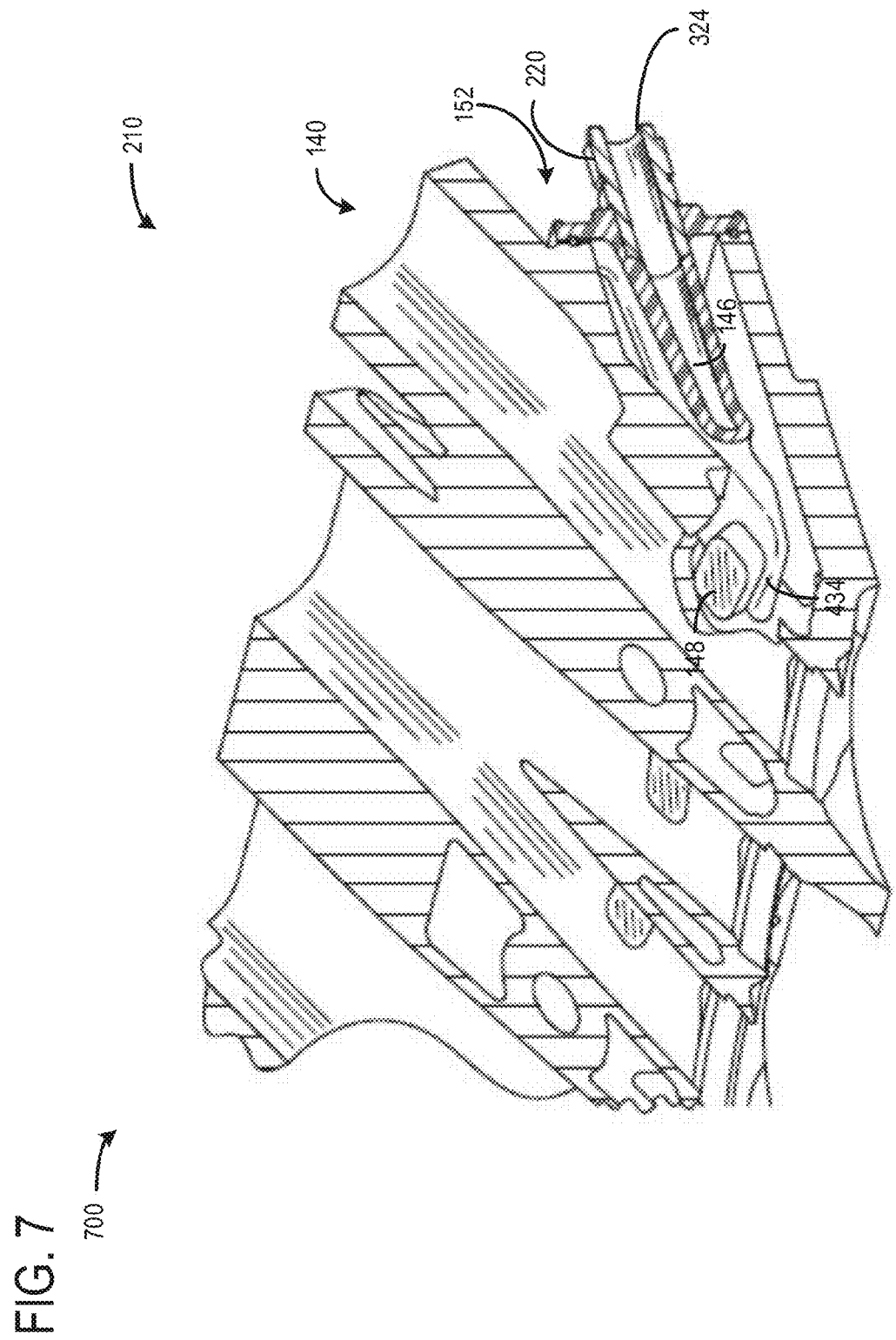

METHOD AND SYSTEM FOR AN ENGINE VARIABLE CHARGE MOTION SYSTEM

FIELD

The present description relates generally to methods and systems for controlling a vehicle engine to adjust a variable bladder in an intake air path.

BACKGROUND/SUMMARY

Increased motion of air and/or fuel charge injected into an engine combustion chamber can increase combustion efficiency under some conditions. For example, charge motion can increase the effectiveness of combustion by introducing air velocity and turbulence in directions perpendicular to the flow direction. By introducing additional kinetic energy into the combustion chambers, an ignition front may traverse the volume of the combustion chamber more quickly and more evenly so as to interact with a heightened amount of fuel before thermal energy is translated to piston motion. Further, resulting turbulence may increase homogenization of the air-to-fuel mixture within the combustion chamber as well as increase the burn rate, which is the time required to for the air/fuel mixture to burn completely during the combustion process.

To improve charge tumble and swirl parameters, various motion control devices may be coupled upstream of the intake of engine cylinders. By varying the charge motion of a cylinder, the cylinder burn rate can be varied. One example motion control device is shown by Overbeck in U.S. Pat. No. 4,928,638. Therein, an individual variable bladder is placed within an engine intake runner. The bladder may be configured to have a variable cross-section, the cross-section varied based on engine operating parameters. Specifically, a degree of inflation of the bladder is adjusted to vary the degree of occlusion of the flow path available for an air-fuel mixture entering the intake manifold.

However, the inventors herein have recognized potential issues with such devices. As one example, the location of the variable bladder inside the intake manifold (but upstream of individual intake runner s) may result in less than optimum charge mixing. While charge mixing may be improved by generating tumble and swirl downstream of the port runners, such a position is too close to the cylinder head. In addition to being spatially constrained, the bladder may be prone to thermal degradation at that position. Further, proximity to the hot cylinder head may affect the ability to control the amount of inflation/deflation achieved. For example, bladder heating may result in more inflation than desired. As such, this may adversely affect a combustion air-fuel ratio control. As another example, the bladder of Overbeck affects the charge motion to all cylinders globally but may not be able to adjust the charge motion of each cylinder individually. As such, there may be conditions where certain cylinders demand more or less charge motion than other cylinders.

In one example, the issues described above may be at least partly addressed by a system comprising a cylinder with an intake runner and a bladder positioned in an opening on a bottom surface of the intake runner nearest the cylinder. In this way, individual cylinder combustion may be improved by providing charge motion to each cylinder at a location inside port runners and closer to the cylinder head.

As an example, a variable cross section bladder may be coupled to a cartridge that is insertable into an engine bulkhead at a location proximate to the cylinder head where individual intake ports deliver air into corresponding cylinders. The bulkhead may be in fluid communication with a coolant passage(s) configured to circulate coolant. The cartridge may include an internal air passage sealed from the coolant by an extension member, the internal air passage delivering air to the bladder for varying an amount of bladder inflation. Based on engine operating conditions, such as air intake throttle position, an amount of air delivered to individual cartridge bladders may be varied. In this way, the bladder may be positioned in the small space available in the vicinity of the cylinder head. By coupling the variable bladder in a cylinder intake port of each cylinder of the engine, the tumble effect generated by the bladder upon inflation is improved. At the same time, by positioning the cartridge adjacent to a coolant passage of the cylinder wall, thermal degradation of the bladder is averted. In addition, the inflation/deflation of the bladder may be controlled more accurately despite the proximity to hot engine components.

The inventors have recognized that the above approach may provide various advantages. As one example, by using one or more of the example embodiments described above, alteration of individual cylinder intake air amounts may be permitted based on existing engine operating parameter(s). Another advantage is that the bladder may be easily installed and removed through the use of the cartridge. For example, the cartridge may comprise one or more variable bladders. The cartridge may be inserted into an opening of a bulkhead between an engine cylinder and an intake runner, wherein the cartridge extends through a portion of a space within the bulkhead. An engine coolant may flood the space within the bulkhead, thereby surrounding the cartridge with coolant. A bladder manifold may be fastened to an exterior of the cartridge in between the engine cylinder and an air intake manifold. In this way, the bladder manifold and cartridge may be compact and may conserve engine space. An advantage is that the bladder increases fuel economy by improving an air/fuel mixture and ultimately, improving a combustion efficiency.

The above discussion includes recognitions made by the inventors and not admitted to be generally known. Thus, it should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 illustrates a detailed depiction of a cartridge withdrawn from the bulkhead.

FIG. 7 depicts a sliced view of the intake port with a bladder located therein.

DETAILED DESCRIPTION

Figure 1:
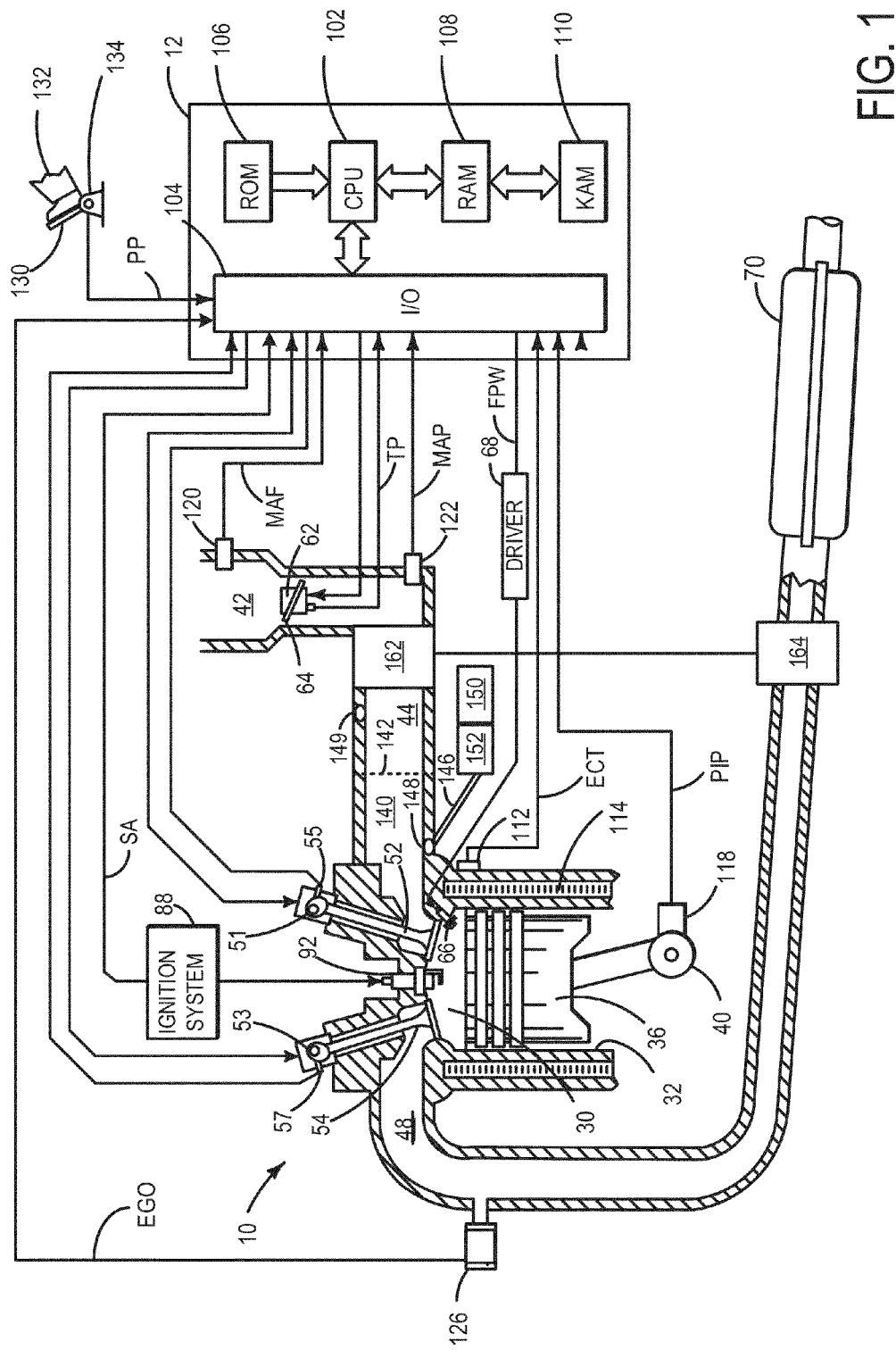
FIG. 1 illustrates an engine including a variable bladder.
Figure 8A:
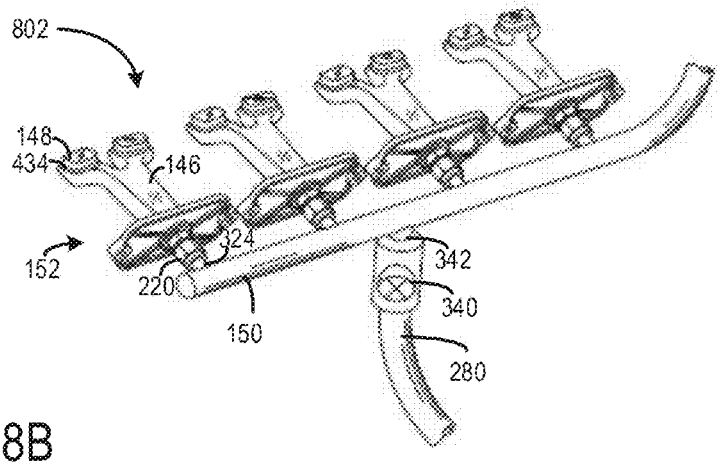
FIGS. 8A, 8B, and 8C depict various embodiments featuring three separate locations for a control valve controlling an air supply to charge motion devices.
Figure 8B:
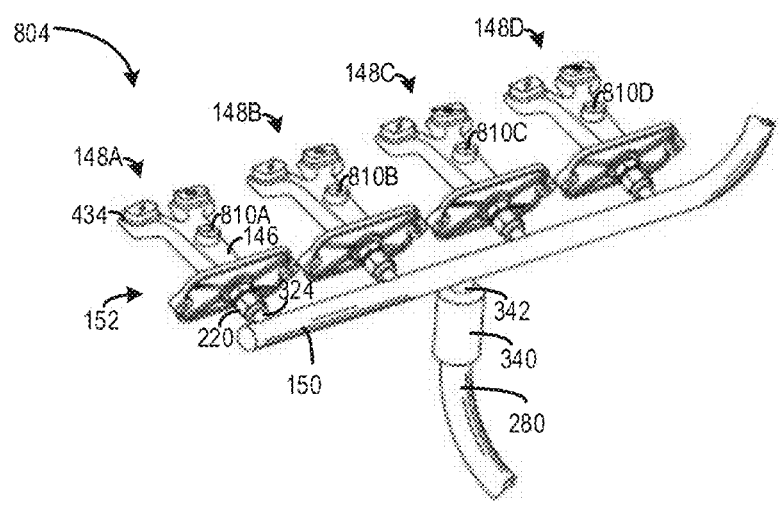
Figure 8C:
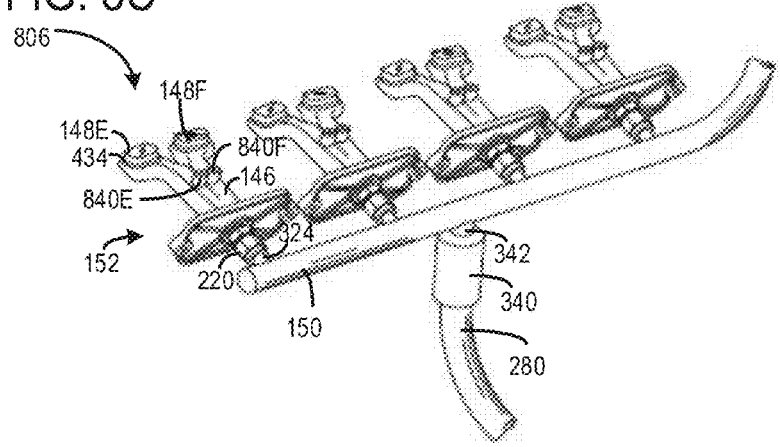

The following description relates to systems and methods for a variable bladder coupled to an engine intake system, such as depicted at FIG. 1. The bladder may be positioned on a cartridge inserted in an engine bulkhead, as shown at FIGS. 2-7. FIGS. 8A-C depict various embodiments of the present disclosure. The bladder may be adjusted via a controller, in coordination with an actuator and information from a variety of applicable sensors. The controller may be programmed with instructions to perform a control routine, such as the routine of FIG. 9, to inflate the bladder responsive to a decreasing engine load (e.g., an intake throttle being more closed) by controlling valves applying compressed air to the bladder and/or venting air from the bladder to the atmosphere. The coordinated operation of a first and second bladder located at distinct positions of the intake port are discussed with respect to FIG. 10.

FIG. 1 is a schematic diagram showing an example embodiment of one cylinder of multi-cylinder engine 10, which may be included in a propulsion system of an automobile. Engine 10 is controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 includes cylinder bore walls 32 with piston 36 positioned therein. As depicted, piston 36 is coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

As shown in the example of FIG. 1, combustion chamber 30 receives intake air from intake manifold 44 via intake passage 42 and exhausts combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Upstream of intake valve 52, a charge motion device (e.g., a variable bladder) 148 may be positioned in an opening of the bottommost wall of an intake port 140. Dashed line 142 represents a border between the intake port 140 and the intake manifold 44. In some examples, the bladder 148 may be spherical. In other examples, the bladder 148 may be oblong and may extend from the intake port 140 towards (and into) intake manifold 44. The bladder 148 may be placed 10-40 mm away from a portion of intake valve 52 in contact with the bottommost wall of the intake port 140. In this position, the bladder 148, when inflated, may obstruct air flowing toward the intake valve 52 and thereby manipulate an airflow to create a tumble effect for charge entering the corresponding cylinder. The tumble may be defined as a swirling motion used to increase an air/fuel mixture homogeneity. A comparison of an inflated bladder and a deflated bladder is shown with respect to FIGS. 5A and 5B.

The variable bladder(s) 148 located within the intake port 140 may be inflated or deflated responsive to a sensed engine condition. As an example, the bladder 148 may at least be partially inflated responsive to a throttle position becoming more closed (e.g., engine load decreasing). This may be due to a reduced air/fuel mixing efficacy caused by a decrease in an airflow rate. To circumvent this dilemma, the bladder 148 may be inflated in order to create a tumble. Due to the proximity of the bladder 148 with respect to a cylinder intake valve 52, (e.g., the bladder may located between 10-40 mm from a bottom portion of the intake valve in contact with the intake runner), the tumble may be created in order to increase an air/fuel mixing efficacy.

The bladder 148 may be flush with the bottommost wall of the intake port 140 upon deflation. In one example, the bladder 148 does not obstruct any part of a bore of intake port 140 in a completely deflated state. The bladder 148 may be coupled to a coolant seal located on a prong at one end of an extension member 146. The extension member may herein also be referred to as a channel. The channel 146 may be hollow and Y-shaped, connected to an interior wall of a cartridge 152. As described above, combustion chamber 30 may include two or more intake valves. If combustion chamber 30 includes two or more intake valves, the channel 146 may furcate to provide a bladder for each intake valve. In this way, a plurality of variable bladders 148 and a plurality of intake valves 52 may exist. The channel 146 may at least partially house a bladder inlet pathway, wherein the variable bladder pathway may assume a shape similar to the channel 146. The variable bladder pathway may extend from the bladder 148 to a bladder manifold 150. The variable bladder pathway will be discussed in further detail with respect to FIG. 3.

In some embodiments, additionally or alternatively, a second variable bladder 149 may be located within the air intake manifold outlet. The second variable bladder 149 may be oblong and larger than the variable bladder 148. The second variable bladder 149 may be located on a topmost wall of an air intake manifold outlet farthest from the combustion chamber 30. That is to say, the engine 10 may include two different bladders, a first variable bladder 148 located on a bottommost wall of a intake port 140 nearest the combustion chamber 30 and a second variable bladder 149 located on the topmost wall of the air intake manifold outlet farthest from the combustion chamber 30. The first bladder 148 may be closer to the combustion chamber compared to the second bladder 149 (e.g., the second variable bladder may be between 100-200 mm away from the intake valve 52). The air intake manifold outlet may be discussed in further detail below. The second variable bladder 149 may be located upstream of a compressor 162 and downstream of dashed line 142. A number of second variable bladders 149 present in the engine 10 may be equal to a number of combustion chambers 30.

In one embodiment, for an engine comprising four combustion chambers, where each combustion chamber comprises two intake valves, the engine may comprise two variable bladders 148 in intake runner s of the combustion chamber and one second variable bladder 149 in an air intake manifold outlet of the combustion chamber. That is to say, the engine described may comprise a total of eight variable bladders 148 and four second variable bladders 149.

The second variable bladder 149 may affect an airflow to all the cylinders intake valves 52 globally, not individually, upon inflation, whereas the variable bladder 148 may only affect an individual cylinder intake valve 52 upon inflation. Therefore, the second variable bladder 149 may at least partially obstruct an airflow to the combustion chamber 30 upon inflation. The second variable bladder 149 may be flush with the upper wall of the air intake manifold outlet upon complete deflation such that it does not obstruct a bore of the air intake manifold outlet.

An inflated second variable bladder may manipulate an airflow through the air intake manifold outlet such that a rate of airflow (e.g., a velocity) is increased. In this way, air may be delivered at an increased rate to the combustion chamber 30. A deflated bladder may permit an increased amount of air to flow through the air intake manifold outlet. A rate of airflow flowing by a less inflated second bladder (e.g., more deflated bladder) may be less than the rate of airflow flowing by a more inflated second bladder.

The second variable bladder 149 may comprise a second bladder manifold with a second bladder manifold pathway leading from a compressed air source to the second bladder manifold. A second bladder control valve may be located between the second bladder manifold and the second bladder manifold pathway. The second bladder manifold may be fluidically coupled to the second bladder via a second bladder pathway. In this way, air from the compressed air source may flow through the second bladder manifold inlet, through an open second bladder control valve, into the second bladder manifold, through the second bladder manifold pathway, and into the second bladder, without flowing into/through the first bladder components, described in further detail below. Additionally or alternatively, the second bladder manifold may comprise a second outflow control valve upstream of a second bladder manifold outlet. The second bladder manifold outlet may be coupled to the same vacuum coupled to a first bladder manifold outlet. By comprising the second control valve and second outflow control valve, the second bladder may be inflated and/or deflated independently of the first bladder. The first bladder 148 may be closer to the combustion chamber compared to the second bladder 149.

The cartridge 152 may comprise an interior wall and an exterior wall. As described above, the interior wall of the cartridge 152 may be coupled to the channel 146. The bladder manifold 150 may be fastened to the exterior wall of cartridge 152 via a boss. The cartridge 152 may be inserted into an opening of a bulkhead located between the air intake manifold 44 and the cylinder 30. The bladder manifold 150 may be located in a space between a cylinder head and the air intake manifold 44, separated from the intake port via coolant passages. Intake port 140, variable bladder 148, second variable bladder 149, channel 146, cartridge 152, and bladder manifold 150 will be discussed in further detail with respect to FIGS. 2-5B.

Intake valve 52 and exhaust valves 54 are controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The positions of intake valve 52 and exhaust valve 54 are determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection of fuel into combustion cylinder 30.

As shown in FIG. 1, intake passage 42 includes a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 is provided to controller 12 by throttle position signal TP, for example. Intake passage 42 further includes a mass airflow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor may give an indication of engine torque, for example. Further, this sensor, along with the detected engine speed, can provide an estimate of charge (including air) inducted into the cylinder. In one example, sensor 118, which is also used as an engine speed sensor, may produce a predetermined number of equally spaced pulses each revolution of the crankshaft.

Figure 2:
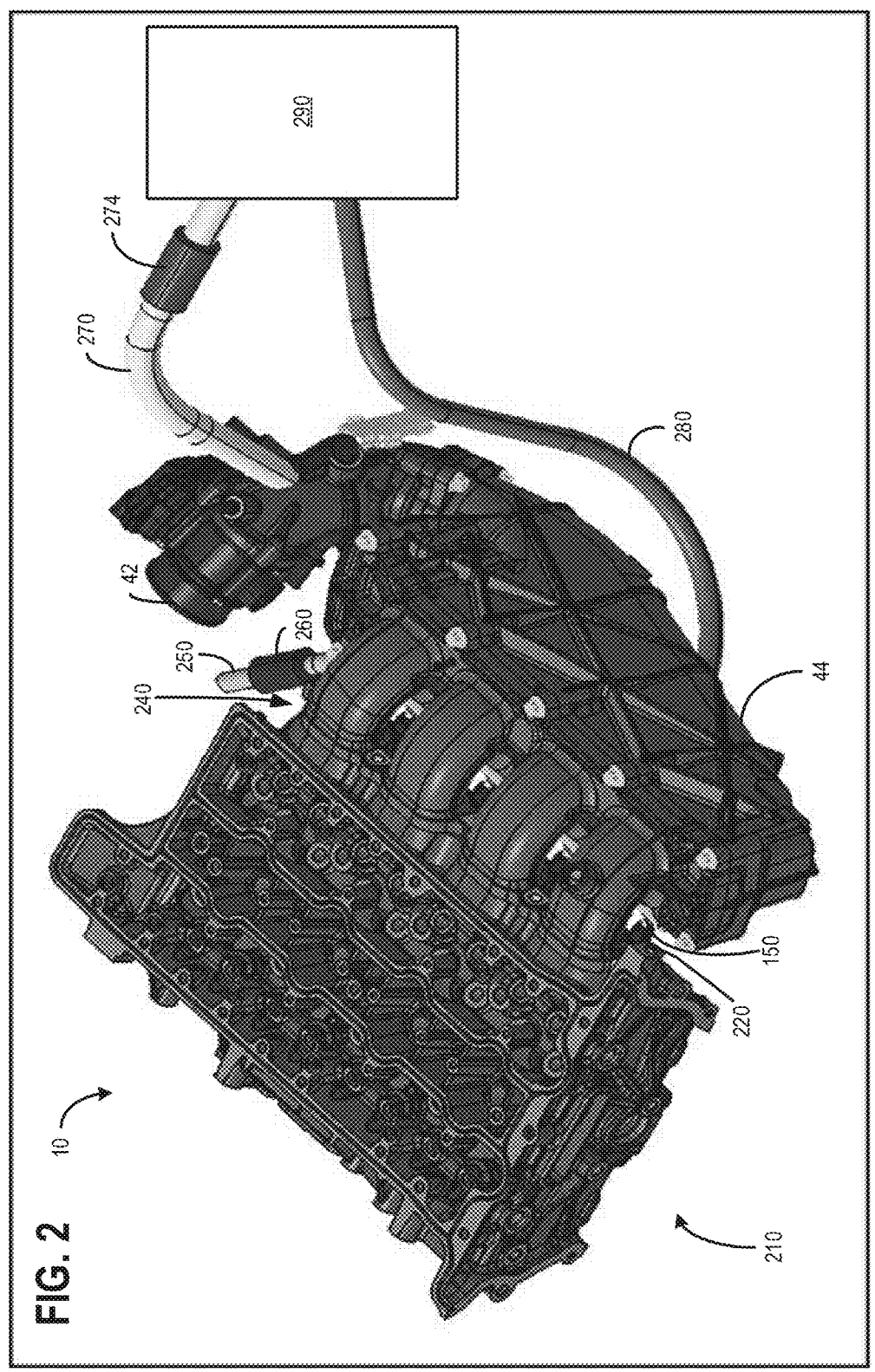
FIG. 2 depicts an engine comprising a cylinder head, an intake manifold, and a bladder manifold.

As discussed above, FIG. 2 illustrates a more concise depiction of engine 10 and air intake manifold 44. Specifically, FIG. 2 depicts a spatial relationship between the engine 10, air intake manifold 44, and bladder manifold 150 that is to scale, although other relative dimensions may be used, if desired. FIG. 2 is to scale.

Engine 10 may include cylinder head 210, which may be fluidically coupled to air intake manifold 44 via air intake manifold runners 240. Air intake manifold runners 240 may extend and bend away from the cylinder head 210 toward a plane parallel to a combustion chamber. In this way, a space may be located between the cylinder head 210 and the air intake manifold 240. A bladder manifold 150 may be located within the space between the air intake manifold 44 and cylinder head 210, directly below the air intake manifold runners 240. As mentioned above, the bladder manifold 150 is coupled to a cartridge (e.g., cartridge 152) via tube fittings 220. A number of tube fittings 220 may be equal to a number of cartridges present in the cylinder head 210. In this way, each cartridge may be directly coupled to the bladder manifold 150. Additional details of the structure of the cartridge will be discussed in further detail below.

Bladder manifold 150 may comprise a bladder manifold outlet 250 downstream of a second control valve 260, which may bleed off to an air inlet system. The outlet 250 may be fluidically coupled to a vacuum source (not shown). The bladder manifold outlet 250 may curve directly upstream of the second control valve 260. The bladder manifold outlet 250 may curve away from the air intake manifold 44 toward the cylinder head 210. It will be appreciated by someone skilled in the art that the bladder manifold outlet 250 may curve in other possible directions based on packaging of the cylinder head and spatial constraints in the vicinity of the cylinder head (e.g., down in the direction of a cylinder). Second control valve 260 may be adjusted so that an amount of negative pressure provided from the vacuum may be adjusted. In this way, a rate of deflation of a variable bladder (e.g., variable bladder 148) may be controlled. For example, if the second control valve 260 is in a more open position, the rate of deflation may be increased compared to a second control valve 260 in a less open position.

Bladder manifold 150 may further include bladder manifold air conduit 280 coupled to a compressed air source 290. The compressed air source 290 may provide an airflow to one or more of the air intake manifold 44 and the bladder manifold 150 via air intake manifold conduit 270 and bladder manifold air conduit 280, respectively. The airflow delivered to the air intake manifold 44 from the compressed air source 290 may be adjusted via a variable valve 274 located between the air intake manifold 44 and the compressed air source 290. Likewise, the airflow delivered to the bladder manifold 150 may be adjusted via a control valve located between the compressed air source 290 and the bladder manifold 150. The air intake manifold conduit 270 is located downstream of an intake passage 42. Compressed air may be generated by a compressor of the engine's turbocharger and stored in a compressed air storage device (e.g., compressed air source 290).

As illustrated, engine 10 comprises four cylinders and as a result, air intake manifold 44 comprises four air intake manifold runners 240. Each air intake manifold runner 240 may lead to a intake port 140. In this way, air may flow through an intake passage (e.g., intake passage 42) into air intake manifold 44, through air intake manifold outlets 240, and then through individual cylinder ports/runners into a corresponding combustion chamber (e.g., cylinder 30). As mentioned above, an intake valve (e.g., intake valve 52) may be actuated to adjust an amount of air received into the combustion chamber. Before reaching the combustion chamber, the airflow may be altered via a variable bladder (e.g., variable bladder 148) based on the degree of inflation of the bladder. For example, airflow may be restricted and charge motion may be increased by increasing the degree of inflation of the bladder.

In some embodiments, additionally or alternatively, a second variable bladder may be located within the air intake manifold outlet 240. The second variable bladder may be oblong. The second variable bladder may be located on a topmost wall of the air intake manifold outlet 240 farthest from a combustion chamber. That is to say, the engine 10 may include two bladders, a first bladder located on a bottommost wall of a cylinder port nearest the combustion chamber and a second bladder located on the topmost wall of the air intake manifold outlet farthest from the combustion chamber.

The first bladder and second bladder may both be coupled to bladder manifold 150 and commonly controlled. Additionally or alternatively, the first bladder may be the only bladder coupled to the bladder manifold 150, while the second bladder may be coupled to a separate bladder manifold. In this way, the first and second bladder may be operated separately. For example, one bladder may be inflated while the other bladder is not inflated. Further, the first bladder and second bladder may be inflated and/or deflated at different rates. This allows charge motion entering a cylinder to be varied at different locations, allowing for improved tumble and swirl control of cylinder charge.

Figure 3:
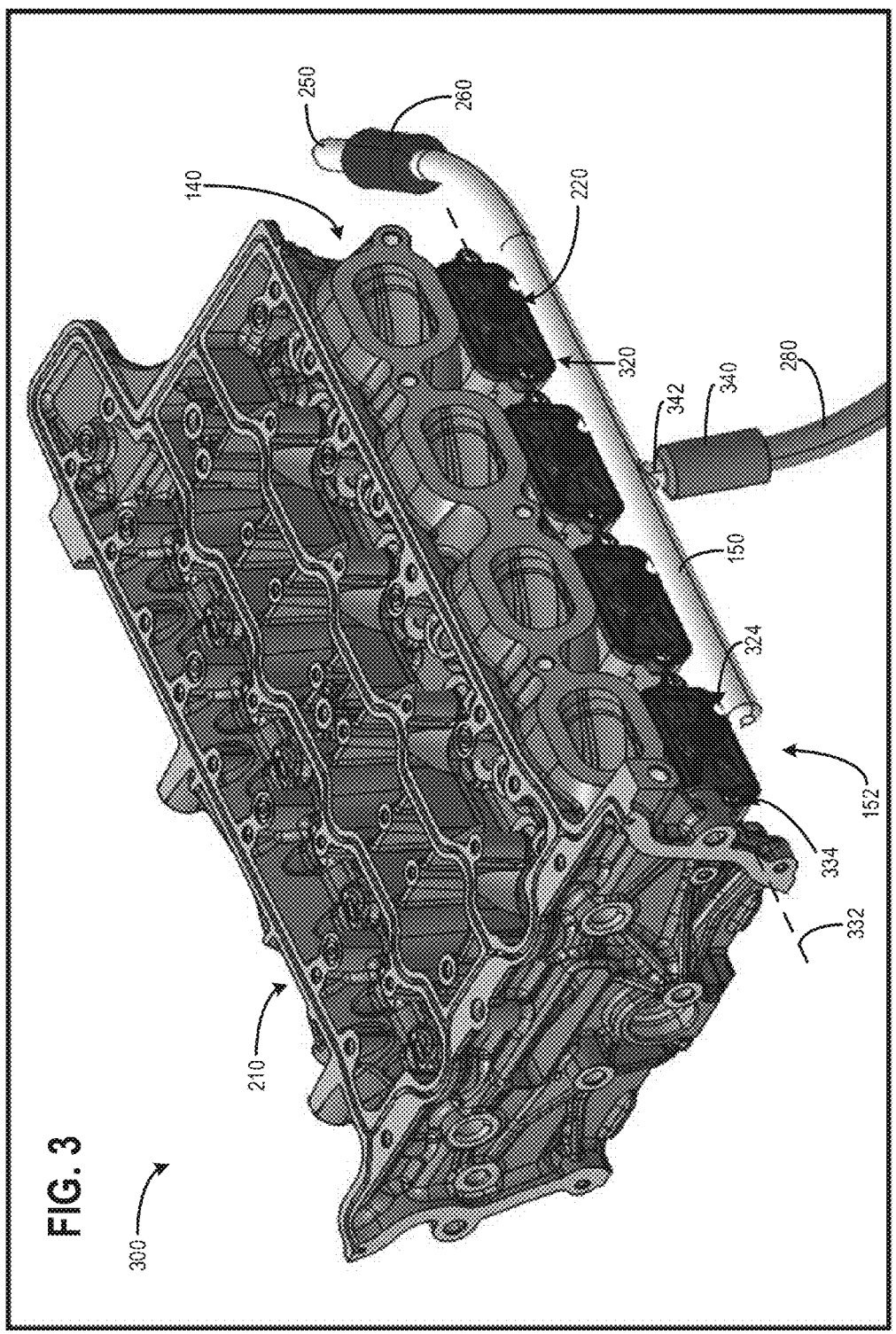
FIG. 3 shows cartridges inserted into bulkheads of the cylinder head.

Turning now to FIG. 3, a perspective view 300 of the cylinder head 210 is shown with the air intake manifold 44 excluded to more accurately depict a space occupied by a bladder manifold 150. FIG. 3 represents a cylinder head with cartridges 152 inserted into a plurality of bulkheads. The cartridges 152 are coupled to a bladder manifold 150, the bladder manifold 150 may be used to inflate or deflate variable bladders coupled to a channel associated with each cartridge. As illustrated in FIG. 2, a space exists between cylinder head 210 and air intake manifold 44. As shown in FIG. 3, the spatial separation may be advantageously occupied by a bladder manifold 150, thereby allowing the bladders to be accommodated despite limited space availability in the vicinity of the cylinder head. Further, the specific location allows coolant to circulate in the vicinity of the bladder, protecting it from thermal degradation. FIG. 3 is to scale.

The cylinder head 210 may comprise a plurality of intake cylinder ports 140. As mentioned above with respect to FIG. 2, the intake ports 140 may be coupled to air intake manifold runner (e.g., air intake manifold runner 240) or an air intake manifold (e.g., air intake manifold 44). As illustrated, a plurality of cartridges 152 are located below the intake ports 140. Specifically, a single cartridge 152 is inserted into a bulkhead located below an individual intake port 140. The bulkhead may be located between a combustion chamber (e.g., cylinder 30) and the individual intake port 140, and more specifically, between a cylinder head and the corresponding individual intake runner.

The bulkhead may have multiple tubular openings, each positioned below a corresponding intake port 140 and facing the air intake manifold 44. Each opening running at least a portion of the length of the cylinder head 210. The opening of the bulkhead may be machined such that an interior wall of the cartridge 152 aligns with an outer rim of the bulkhead opening. In this way, a coolant located in a space within the bulkhead may not leak out of the bulkhead space upon insertion of the cartridge 152 into the bulkhead. The bulkhead space may extend from an opening of the bulkhead to a combustion chamber wall (e.g., combustion chamber wall 32) nearest the air intake manifold 44. The bulkhead space may be large enough to house the entirety of the cartridge 152. The bulkhead will be discussed in more detail with respect to FIG. 4.

Each cartridge 152 may include an exterior face 320. Each exterior face 320 may comprise a boss 220 fastening an individual bladder manifold (e.g., bladder manifold 150) to the exterior face 320 of the cartridge 152. The portion of the bladder manifold 150 in communication with the exterior face 320 may be configured, in one example, as a dowel pin. Accordingly, in one embodiment, a plurality of tube fittings 220 may connect a plurality of exterior faces 320 to seal bladder actuation air path to atmosphere as well as engine cylinder head cooling jacket. The axis of the bladder manifold 150 is parallel to a lateral axis 332 (or exterior face) of cartridge 152. In this way, a number of connecting points between the bladder manifold 150 and the cartridges 152 may be equal to the number of cartridges 152. As shown in the current example, four cartridges are located within the cylinder head 210. Accordingly, four connecting points exist between the cartridges 152 and the bladder manifold 150. However, in alternate embodiments, the number of cartridges and connecting points may be larger or smaller.

Each cartridge 152 may be secured to an outer flange of the bulkhead via a plurality of bolts 334. As shown, bolts 334 may be inserted opposite one another along a lateral axis 332 of the cartridge 152 (that is, along the width of the cartridge, along an axis that runs parallel to the axis of the bladder manifold 150). The bolts 334 may be inserted into corresponding holes located on the exterior face 320 of the cartridge 152, the holes positioned, symmetrically, along the lateral axis 332 (along the longer plane) of the cartridge. In this way, each cartridge may occupy a space below a cylinder intake port 140, between a cylinder head 210 and the cylinder. The channel and the bulkhead will be discussed in further detail with respect to FIG. 4.

Variable bladder inlets 324 may fluidically couple the bladder manifold 150 to an interior portion of the cartridge, specifically to an interior channel of the cartridge (described in FIG. 4). The interior channel may traverse from an end of the variable bladder inlets 324 to a variable bladder (e.g., variable bladder 148) located in the intake port 140. A portion of the variable bladder inlet 324 may be at least partially housed by the channel. The portion of the variable bladder inlet 324 housed by the channel may be below the intake ports 140 within a bulkhead.

Continuing from the exterior face 320, the variable bladder inlet 324 may connect to the bladder manifold 150. The diameter of the variable bladder inlet 324 may be less than the diameter of the bladder manifold 150. The bladder manifold 150 may follow along axis 332 in a linear fashion and bend directly upstream of second control valve 260. The bladder manifold 150 may provide air to a plurality of variable bladder inlets 324. The bladder manifold 150 may receive air via a bladder manifold air conduit 280 fluidically coupling the bladder manifold to a compressed air source (e.g., compressed air source 290). A first control valve 340 may be located along the bladder manifold air conduit 280 at a location near a bladder manifold inlet 342 of the bladder manifold 150 for controlling an amount of air delivered to the bladders via the bladder manifold 150. As depicted, the bladder manifold inlet 342 may be coupled to the bladder manifold 150 between the centermost cartridges. Additionally or alternatively, the bladder manifold inlet 342 may be located proximate to one of the outermost cartridges. Therefore, air may flow from the compressed air source into the bladder manifold 150 as long as the first control valve 340 is at least partially open. The first control valve 340 may be used to adjust an airflow into the bladder manifold 150. If the first control valve 340 is closed, then the bladder manifold 150 may not receive air, resulting in the bladders in the intake ports 140 also not receiving air.

The air in the bladder manifold 150 may flow out the bladder manifold 150 via a bladder manifold outlet 250. Bladder manifold outlet 250 may be offset from a main axis of bladder manifold 150. Specifically, bladder manifold 150 may extend longitudinally along a length of the cylinder head 210, parallel to a lateral axis 332 of the cartridges, and then, past the last cartridge, the axis of the bladder manifold may curve or slightly bend and turn towards a side of the cylinder head 210. A second control valve 260 is positioned along bladder manifold 150 at a position immediately past the bend in the bladder manifold. Air may flow through the bladder manifold outlet 250 if second control valve 260 is at least partially open. The second control valve 260 may be used to adjust an exit airflow rate from the bladder manifold 150 through the bladder manifold outlet 250. The bladder manifold outlet 250 may be coupled to a vacuum, which may assist in the outflow of air through the bladder manifold outlet 250 by applying a negative pressure on the bladder manifold 150. In this way, air may be pulled from the bladder manifold 150 via the vacuum. However, if the second control valve 260 is in a closed position, the bladder manifold 150 may not experience the negative pressure created by the vacuum and air may not flow through the bladder manifold outlet 250. If the second control valve 260 is in a closed position, the bladders located in the intake ports 140 may not deflate.

FIG. 4 shows a blown-up view 400 of the cylinder head, depicting one intake port, bulkhead, and cartridge of the cylinder head. As described above, the cylinder head may comprise a number of intake runners, bulkheads, and cartridges, the number equal to a number of combustion chambers. FIG. 4 is to scale.

Cylinder head 210 comprises an intake port 140 above a bulkhead 410. The bulkhead 410 may be located between the intake port 140 and a combustion chamber (e.g., cylinder 30). The bulkhead 410 may be on a side of the combustion chamber nearest a bladder manifold 150. There may be a coolant jacket (not shown), including coolant passages, opening into spaces in the bulkhead 410 such that coolant may flow through the spaces within the bulkhead 410. Accordingly, a bulkhead seal 414 may be positioned on an outer flange on a bulkhead opening directed toward a space between the cylinder head 210 and the bladder manifold 150. For example, the bulkhead opening may open to a space occupied by the bladder manifold 150 between the cylinder head 210 and an air intake manifold (e.g., air intake manifold 44), with respect to FIG. 2. In this way, the bulkhead seal will prevent coolant leaking to atmosphere.

Cartridge 152 is inserted into bulkhead 410. As shown, cartridge 152 is designed such that the dimensions of cartridge 152 match the dimensions of an opening of the bulkhead 410 and the cartridge 152 can be mated into the bulkhead 410. Upon inserting cartridge 152 into the bulkhead 410, an interior face of the cartridge 152 is pressed against the bulkhead seal 414 such that coolant may not flow out of the bulkhead 410. The cartridge 152 may be fastened to the bulkhead 410 via bolts 334. The bolts 334 may be first driven through corresponding holes 418 on the cartridge 152 and then through corresponding holes 422 on the outer surface of the bulkhead 410. The cartridge corresponding holes 418 and bulkhead corresponding holes 422 align upon insertion of the cartridge 152 into the bulkhead 410. As mentioned above, the bolts 334 may be positioned opposite one another along a lateral axis of the cartridge 152. The cartridge corresponding holes 418 and bulkhead corresponding holes 422 may be threaded so that the cartridge 152 may be fayed to the bulkhead 410 upon inserting and tightening bolts 334 through the cartridge corresponding holes 418 and bulkhead corresponding holes 422.

A channel 146 extends from the internal face of the cartridge 152 and occupies a portion of the space located within the bulkhead 410. In this way, the channel 146 is surrounded by coolant upon inserting the cartridge 152 into the bulkhead 410. The channel 146 may be hollow and Y-shaped. A variable bladder 148 may be coupled to a coolant/air path seal 434 coupled to each pronged end of the channel 146. An end of the channel 146 may herein be referred to as a prong. The channel may be a Y-shape in order to provide the bladder 148 to each intake valve (e.g., intake valve 52) of a given combustion chamber. For example, the channel 430 may be Y-shaped as shown to provide two bladders 148 to two separate intake valves of a combustion chamber. In alternate examples, channel 146 may be linear and non-furcating where the combustion chamber comprises only one intake valve. It may be appreciated by someone skilled in the art that the channel 146 may be shaped such that it is able to provide a number of bladders 148 equal to a number of intake valves of the cylinder.

As the cartridge 152 is inserted into the bulkhead 410, the coolant/air path seal 434 may be physically coupled to an outer surface of an opening located in a bottommost wall of the intake port 140 nearest a combustion chamber. In this way, coolant flooding spaces within the bulkhead 410 may not enter the intake port 140, regardless of a degree of inflation of the variable bladder 148. Conversely, the air traveling through the cylinder head ports may not enter the water jacket. The opening may accommodate the bladder 148 such that the diameter of the opening is substantially equal to the diameter of the bladder 148. When the bladder 148 is deflated, the bladder 148 may be flush with the bottommost wall of the intake port 140. In this way, a fully deflated bladder 148 may not obstruct any passages within the intake port 140. With reference to FIG. 1, a distance between the bladder 148 and an intake valve 52 may be between 10-40 mm. As mentioned above, the distance allows an at least partially inflated bladder to manipulate an airflow through the intake port 140 and create a tumble by at least partially obstructing intake port 140. The tumble may be defined as a circular, swirling motion which may increase a mixing efficacy of an air/fuel mixture.

The bladder 148 may be fluidically coupled to a bladder manifold 150 via a variable bladder inlet 324 and a variable bladder pathway 440. The variable bladder pathway 440 may be at least partially housed by the channel 146. The coolant flooding the bulkhead 410 surrounds an exterior of the channel 146 and is isolated from the variable bladder pathway 440. As presented in FIG. 4, the channel 146 is a Y shape, therefore the variable bladder pathway 440 may furcate as the channel 146 furcates. In other words, the variable bladder pathway 440 may assume a shape similar to a shape of the channel 146.

The variable bladder pathway 440 may extend from a bottom of the bladder 148 to an exterior wall 320 of the cartridge 152. The variable bladder pathway 440 may be adjoined to and fluidically coupled with the variable bladder inlet 324 via a tube fitting 220. The tube fitting 220 is threaded into cartridge 152, the opposite end has a compression type sealing arrangement that creates an air tight connection to the bladder manifold 150 providing a sealed conduit between the bladder manifold 150 and cartridge 152. In this way, the variable bladder pathway 440 is fluidically coupled and adjoined to the variable bladder inlet 324.

Figure 5A:
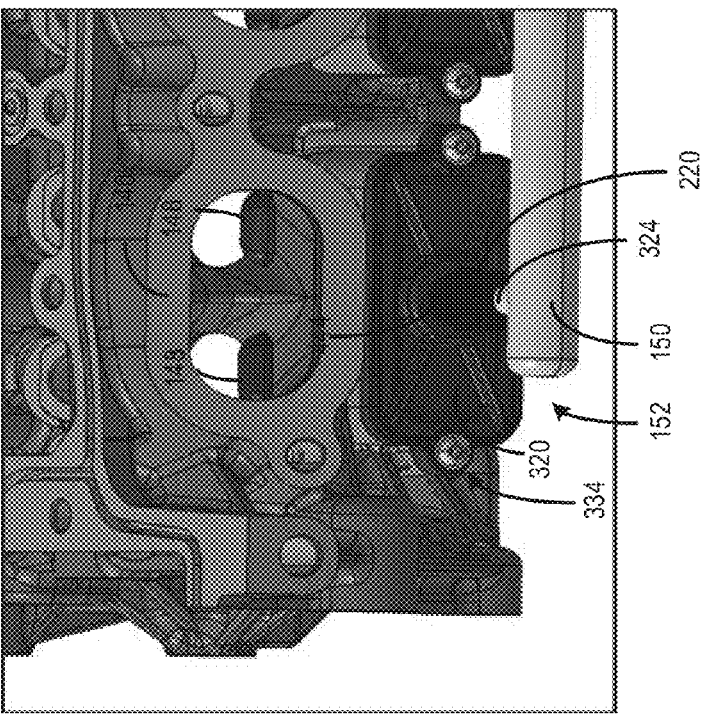
FIGS. 5A and 5B depict bladders in a intake port in either a deflated state or inflated state, respectively.
Figure 5B:
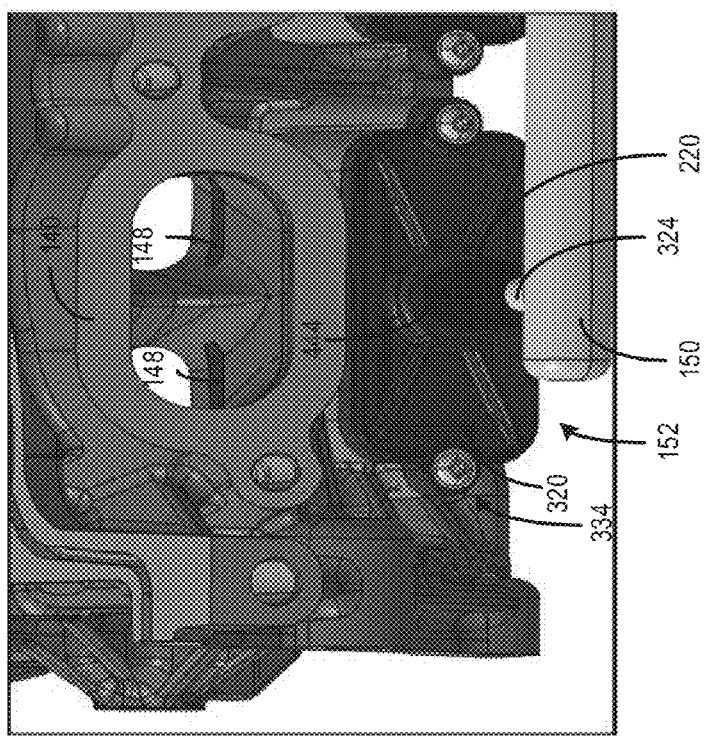

As described above, a degree of inflation of the variable bladder 148 may be adjusted based on engine operating conditions. In one example, the bladder 148 may be inflated so that it may partially obstruct an air pathway within the intake port 140. Additionally or alternatively, the bladder 148 may be deflated so that it may be flush with a bottommost wall of the intake port 140 and not obstruct the air pathway in the intake port 140. FIGS. 5A and 5B, respectively, show a bladder in the deflated and inflated states.

FIGS. 5A and 5B depict a cylinder head 210 with an intake port 140 and a cartridge 152. The cartridge 152 may be fastened to a bulkhead (e.g. bulkhead 410) via bolts 334 inserted into corresponding threaded holes. An exterior wall 320 may be fastened to a variable bladder inlet 324 via a tube fitting 220. A variable bladder inlet 324 may be fluidically coupled to the bladder manifold 150. It will be appreciated that while FIGS. 5A-B depict the bladder in a fully deflated or inflated state, this is not meant to be limiting and that in alternate examples, the bladders may have any degree of inflation in between the fully inflated and fully deflated states. FIGS. 5A and 5B are both to scale.

Turning now to FIG. 5A, bladders 148 are shown in a fully deflated state in the intake port 140. As described above, a fully deflated bladder in the intake port 140 may be completely flush with the bottommost wall of the intake port 140 proximate to the combustion chamber. In this way, air flowing from an intake manifold (e.g., intake manifold 44) to the intake port 140 may not be obstructed and/or manipulated by the bladders 148. By deflating the bladder, a rate of airflow to the corresponding cylinder may be increased.

Bladders 148 may be deflated via disabling a compressed air source (e.g., compressed air source 290), at least partially closing a control valve (e.g., first control valve 340), at least partially opening a second control valve (e.g., second control valve 260), and applying a vacuum. A deflation rate may be adjusted by adjusting one or more of the second control valve and the pressure of vacuum applied. For example, adjusting the second control valve to a more open position may increase the deflation rate while applying a constant negative pressure. Likewise, increasing a negative pressure introduced by the vacuum may also increase the deflation rate for a second control valve in a fixed, at least partially open position.

The fully deflated bladders 148 shown in FIG. 5A are illustrated as being flush with the bottommost walls of the intake port 140. As mentioned, fully deflated bladders 148 may not manipulate an airflow through the intake port 140. In this way, a tumble may not be created and an airflow rate may be increased.

Turning now to FIG. 5B, bladders 148 are shown in a fully inflated state in the intake port 140. As described above, a fully inflated bladder in the intake port may at least partially obstruct and manipulate an airflow passing through the intake port 140 into a combustion chamber. The bladders 148 may be fully inflated to manipulate the airflow and create a tumble, which may increase mixing of an air/fuel mixture. By doing this, fuel efficiency may be increased.

Additionally or alternatively, the bladders may be partially inflated to manipulate the airflow and create tumble. However, the tumble created by the partially inflated bladders may be less than the tumble created by a fully inflated bladder. Further, the partially inflated bladder may provide an increased airflow to the combustion chamber compared to the airflow provided by the fully inflated bladders.

The bladders 148 may at least be partially inflated via disabling the vacuum, closing the second control valve 260, at least partially opening the first control valve 340, and initiating the compressed air source. An inflation rate may be adjusted via adjusting one or more of the control valves and the compressed air source. For example, adjusting the first control valve 340 to a more open position may increase the inflation rate. Likewise, increasing an inflation air pressure provided by the compressed air source may increase the inflation rate.

Figure 6:
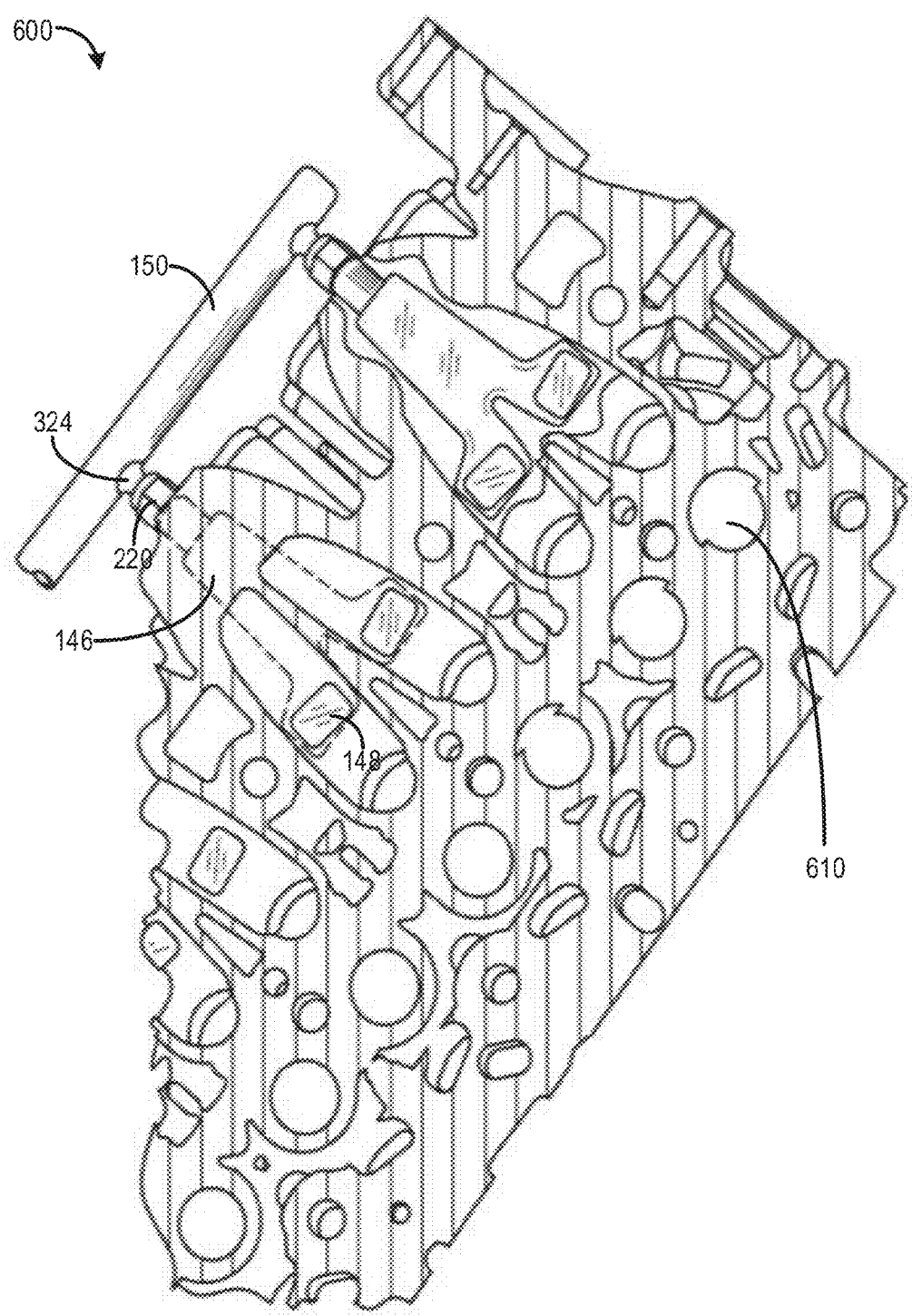
FIG. 6 depicts a top view of the cartridge inserted into the bulkhead with the cylinder head removed.

FIG. 6 depicts an embodiment 600 illustrating a top view of the channel 146, the bladder(s) 148, and exhaust ports 610 with the cylinder head removed. FIG. 7 depicts a cross-sectional view, split perpendicular to axis 332, of intake port(s) 140, channel 146, and bladder 148. As depicted, the intake port 140 extends in a downward slope to a cylinder and as a result, a prong of the channel also comprises a downward slope corresponding to the slope of the intake port 140. In this way, the intake port 140 may house the bladder 148 more securely. Furthermore, channel 146 is substantially linear upstream of a bi-furcation, in which the channel 146 begins to slope downward, corresponding to the slope of the intake port 140, downstream of the bi-furcation.

FIGS. 8A, 8B, and 8C illustrate different possible locations for a control valve. FIG. 8A illustrates an embodiment 802 depicting a control valve 340 being upstream of the bladder manifold 150. In this way, bladders 148 may all receive a substantially equal amount of air. In this way, the bladders 148 may not be inflated independently of each other.

FIG. 8B illustrates an embodiment 804 depicting a control valve 810 downstream of an interior wall of the cartridge 152 and upstream of the bladders 148. As depicted, bladders 148A-D may be controlled independently of each other. In this way, bladders 148A may receive a first inflation amount, while bladders 148 receive a second higher or lower inflation amount. As a result, a first cartridge may provide an air supply to the bladders of the first cartridge that is not equal to an air supply supplied to the bladders of a second cartridge.

FIG. 8C illustrates an embodiment 806 depicting control valves 840E and 840F downstream of an interior wall of the cartridge 152 and upstream of the bladders 148E and 148F. Bladder 148E may receive a first amount of air that is higher or lower than a second amount of air supplied to bladder 148F of the same cartridge. That is to say, a first bladder of a first cartridge may receive an air supply independent of an air supply supplied to a second bladder of the first cartridge or a third bladder of a second cartridge.

The methods and conditions for inflating/deflating the bladders 148 will be described in further detail below with respect to FIG. 9. Further, methods and condition for an embodiment including a first bladder coupled to a cylinder port and a second bladder coupled to an intake manifold are described with respect to FIG. 10.

Figure 9:
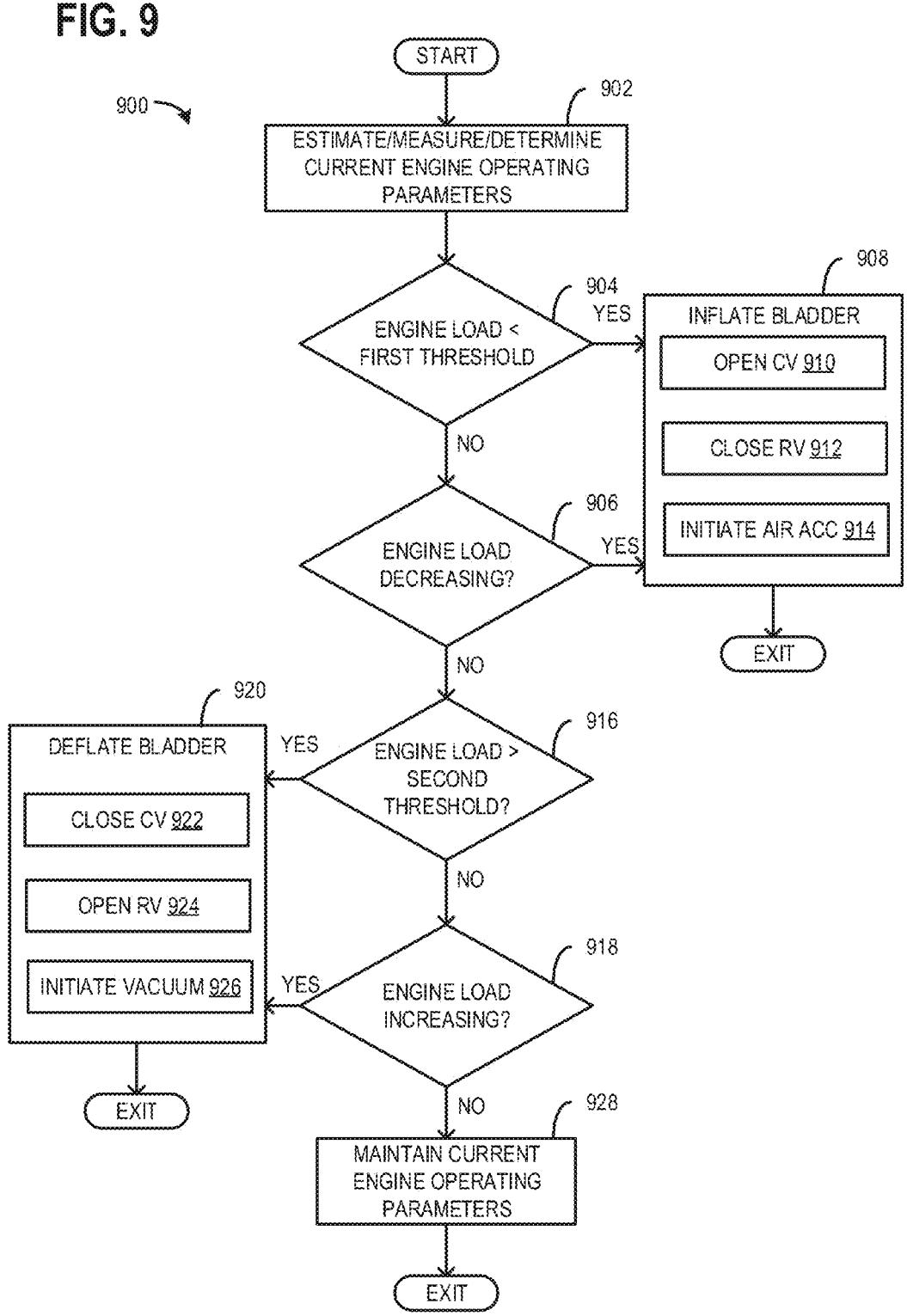
FIG. 9 demonstrates an exemplary method for adjusting a variable bladder in the intake port.

FIG. 9 illustrates an exemplary method 900 for adjusting inflation of a bladder in an intake runner of an engine cylinder head. The method may include conditions for at least partially inflating the bladder due to a decreasing engine load to introduce/increase a tumble effect on the air/fuel mixture. In addition, the method may include conditions for at least partially deflating the bladder due to an increasing engine load to provide a tumble while allowing an increased rate of airflow.

The method 900 may begin at 902 where the controller estimates, measures, and/or determines current engine operating parameters. The current engine operating parameters estimated may include, but are not limited to, manifold airflow rate, vehicle speed, throttle position, manifold vacuum, engine speed, boost level, compressor speed, and combustion air/fuel ratio. An engine load may be determined via one or more of the vehicle speed, throttle position, and manifold vacuum.

At 904, the method 900 includes determining if a current engine load is less than a first threshold. The first threshold may reflect a low engine load. In one example, the current engine load may be less than the first threshold when the engine is at idle and/or the throttle position is at least partially closed. As such, when the throttle is in the mostly closed position, less airflow is provided to the engine, reflecting that the current engine load is less than the first threshold.

If the engine load is not less than the first threshold, then the method proceeds to 906 to determine if the current engine load is decreasing. A decreasing engine load may be confirmed based on a throttle position decreasing at more than a threshold rate (e.g., being commanded towards a fully closed position), a decreasing vehicle speed, and an increasing manifold vacuum.

If the engine load is less than the first threshold (at 904) or the engine load is decreasing (at 906), then the method 900 may proceed to 908 and inflate the bladder. At 908, inflating the bladder includes each of at least partially opening the control valve 910, closing the second control valve 912, and initiating delivery of air from a compressed air source 914. As mentioned above, a degree of inflation of the bladder may be adjusted via adjusting one or more of the control valves and the pressure of air output from the compressed air source. Therefore, a desired degree of bladder inflation may first be determined based on the engine load, the degree of inflation increased as the engine load decreases (e.g., below the first threshold). Then, the opening of the control valve and/or the output of the compressed air source may be adjusted based on the desired degree of bladder inflation. In one example, when the engine load is less than the first threshold and the engine load begins to further decrease, the bladder may be maintained fully inflated. Air may flow from the compressed air source, through the bladder manifold inlet, through the at least partially open control valve, into the bladder manifold, and then through the bladder manifold pathway into a bladder inlet, and on to the bladder.

As an example, a vehicle may transition from a high load to a mid-load region. Responsive to the decreasing engine load, the controller may determine that the bladder is to be inflated. However, based on the engine load being within a threshold distance of the first threshold, the bladder may not be fully inflated. As such, if the engine load were beyond the threshold distance of the first threshold, the bladder may be fully inflated. By maintaining the bladder less than fully inflated at the mid-load region, a desired airflow rate may be provided at the mid-load condition.

It will be appreciated that when the engine load is higher than the first threshold, but lower than a second threshold (as elaborated below), the degree of inflation may be similarly adjusted based on engine load. Specifically, when the engine load is between the first threshold and second threshold, the bladder may be partially inflated, but not fully inflated or fully deflated.

Returning to 906, if it is determined that the current engine load is not decreasing and the engine load is less than the first threshold, then the method 900 proceeds to 916 to determine if the current engine load is greater than the second threshold. As mentioned above, the second threshold may be a higher engine load. The engine load may be determined to be higher than the second threshold if a throttle position is more open (e.g., at wide open throttle), vehicle speed is high (e.g., greater than 40 mph), and/or a manifold vacuum is low.

If the current engine load is not greater than the second threshold then the method 900 proceeds to 918 to determine if the current engine load is increasing. The engine load may be determined to be increasing if a throttle opening is increasing at a threshold rate (e.g., towards wide open throttle), the vehicle speed is increasing, and/or the manifold vacuum is decreasing.

If the method 900 determines that the engine load is greater than the second threshold or that the engine load is increasing, then the method 900 may proceed to 920 and deflate the bladder. It may be preferred to deflate the bladder at increasing engine loads to increase air/fuel mixing at higher loads via an increased rate of airflow. Therefore, fuel efficiency may be increased by deflating the bladder to provide the increased rate of airflow while decreasing charge tumble. A degree of deflation may be determined based on the engine load. Specifically, the degree of deflation may be increased as the engine load increases (e.g., above the second threshold).

At 920, the method 900 includes deflating the bladder by one or more of closing a control valve 922, opening a second control valve 924, and initiating application of a vacuum to the bladder manifold 926. As discussed above, a rate of deflation may be adjusted by adjusting an opening of the second control valve and/or by adjusting the amount of negative pressure provided by the vacuum source. As an example, the rate of deflation may be increased by increasing an opening of the second control valve. Likewise, the rate of deflation may be increased by increasing the negative pressure applied from the vacuum source. In this way, air may flow out of the bladders at an increased rate to deflate the bladder. During conditions for deflating the bladder, air may flow from the bladder to the bladder inlet, through the bladder manifold pathway and into the bladder manifold, and then through an at least partially open second control valve, and into the vacuum source. The method may then exit.

In one example, when the engine load is greater than the second threshold but within a threshold distance of the second threshold, the bladder may be only partially deflated. However, if the engine load is greater than the second threshold, and beyond the threshold distance of the second threshold, the bladder may be fully deflated. This may be due to a demand for increased airflow and decrease tumble at the higher load. The fully deflated bladder may not obstruct an intake runner (e.g., cylinder port) and not manipulate an airflow tumble. Deflating the bladder at higher engine loads may allow the desired air demand to be met.

Returning to 918, if it is determined that the engine load is not increasing, then the method may proceed to 928 and maintain current engine operating parameters which includes not adjusting the bladder. For example, an existing inflation/deflation state of the bladder may be maintained. The method may then exit.

Method 900 thus represents an exemplary method for adjusting operation of a single, variable bladder located in an intake runner of a cylinder head. The bladder may be inflated upon determining an engine load is decreasing and deflated upon determining an engine load is increasing. In this way, combustion may be optimized by inflating the bladder to provide a tumble to increase air/fuel mixing at lower engine loads and by deflating the bladder to provide an increased airflow at higher engine loads.

Figure 10:
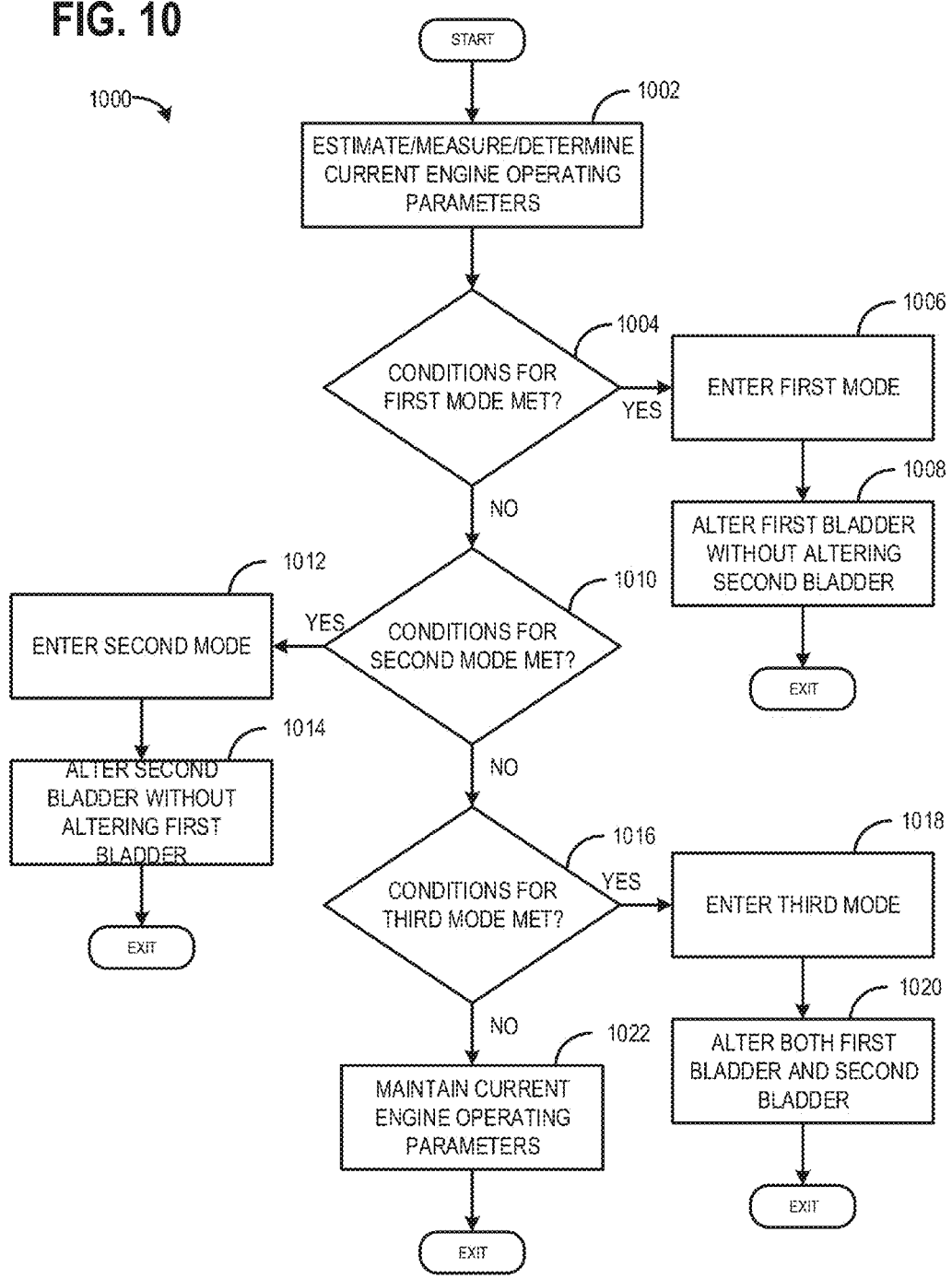
FIG. 10 demonstrates an exemplary method for adjusting two, distinctly positioned bladders within an intake system of the engine.

FIG. 10 demonstrates method 1000 which may be used for adjusting each of a first bladder in an intake port (e.g., cylinder port) and a second bladder in an intake manifold upstream of the intake port. The method 1000 may be implemented independently of method 900. In the depicted embodiment, each of the first and second bladder are coupled to a common cylinder. Similarly, first and second bladders may be present for each engine cylinder in the intake port and in the intake manifold runner to allow flow to each cylinder to be adjusted independently and individually. However, in alternate embodiments, each cylinder may have a first variable bladder in the corresponding runner while the second bladder may be present as a common bladder for all engine cylinders, the second common bladder positioned in the intake manifold at a location upstream of the runner inlets. Herein, the first bladder may allow for individual airflow adjustments to the cylinder while the second bladder allows for global (common) airflow adjustments to all engine cylinders.

The bladders may be adjusted in response to a sensed vehicle operating parameter. As elaborated below, the controller may operate in at least three modes with the bladders in different states of inflation/deflation. During a first mode, the controller may alter the inflation state of the first variable bladder without altering the second variable bladder. During the second mode, the controller may altering the state of inflation of the second variable bladder without altering the first variable bladder. During the third mode, the controller may alter both the first variable bladder and the second variable bladder. The first, second, and third modes may be mutually exclusive of one another.

The method 1000 may begin at 1002, which includes estimating, measuring, and or determining engine operating parameters. The engine operating parameters assessed may include, but are not limited to, measuring an airflow rate, a vehicle speed, a throttle position, a manifold vacuum, an engine speed, boost level, and an air/fuel ratio. An engine load may be determined via one or more of the vehicle speed, throttle position, and manifold vacuum.

At 1004, the method includes determining if conditions for the first mode are met. Conditions for entering the first mode may be based on one or more of the throttle position, engine load, airflow rate, and air/fuel mixing. In one example, the first mode may be entered responsive to a demand for increased air tumble while an engine airflow rate is met. In another example, the first mode may be entered responsive to the second bladder being fully inflated while engine load decreases (and a further drop in airflow is demanded). In still another example, the first mode may be entered responsive to the second bladder being fully deflated while engine load increases (and a further rise in airflow is demanded).

If the conditions for entering the first mode are met, then the method 1000 may proceed to 1006 to enter the first mode. At 1008, operating in the first mode includes altering an inflation/deflation state of the first bladder without altering the second bladder (that is, while maintaining the state of the second bladder). Altering only the first bladder may include either inflating or deflating the bladder based on the sensed vehicle operation. As an example, if an engine load is decreasing (e.g., throttle position becomes more closed), then the altering may include increasing a degree of inflation of the first bladder. Alternatively, if the engine load is increasing (e.g., throttle position become more open), then the altering may include increasing a degree of deflation of the first bladder. As described above, the first bladder may be selectively altered in the first mode while the second bladder remains unaltered. As such, the second bladder may be fully deflated, partially inflated, or fully inflated when the first mode is entered. Thus, the first bladder may be altered to be more inflated or more deflated than the second bladder in the first mode. The method 1000 may then exit.

If the entry conditions for the first mode are not met, then the method 1000 may proceed to 1010 to determine if entry conditions for the second mode are met. Entry conditions for the second mode may be based on an intake airflow rate (e.g., the airflow rate being different from a desired airflow rate), a changing engine load, and a manifold vacuum being deviated from a desired vacuum. In one example, the second mode may be entered responsive to a demand for increased airflow while a tumble rate is met. In another example, the second mode may be entered responsive to the first bladder being fully inflated while engine load decreases (and a further drop in airflow is demanded). In still another example, the second mode may be entered responsive to the first bladder being fully deflated while engine load increases (and a further rise in airflow is demanded).

If the conditions for the second mode are met, then the method 1000 proceeds to 1012 to enter the second mode. At 1014, the method 1000 includes altering an inflation/deflation state of the second bladder without altering the inflation/deflation state of the first bladder during the second mode (that is, while maintaining the state of the first bladder). Altering only the second bladder may include either inflating or deflating the bladder based on the sensed vehicle operation.

As an example, when an increase in airflow rate is desired at the given amount of tumble, the altering may include increasing a degree of inflation of the second bladder. Alternatively, if a decrease in airflow rate is desired at the given amount of tumble, then the altering may include increasing a degree of deflation of the second bladder. As described above, the second bladder may be selectively altered in the second mode while the first bladder remains unaltered. As such, the first bladder may be fully deflated, partially inflated, or fully inflated when the second mode is entered. Thus, the second bladder may be altered to be more inflated or more deflated than the first bladder in the second mode. The method 1000 may then exit.

If the entry conditions for the second mode are not met then the method 1000 may proceed to 1016 to determine if conditions for the third mode are met. Conditions for the third mode may be based on each of engine load, throttle position, and intake airflow rate. In one example, the third mode may be entered responsive to each of a desired tumble and a desired intake airflow rate not being met. In another example, the third mode may be entered responsive to a tip-out at low engine load, or a tip-in at high engine load, such as a tip-out to closed throttle at low engine load or a tip-in to WOT at high engine load.

If the entry conditions for the third mode are met, then the method 1000 may proceed to 1018 to enter the third mode. In the third mode, the method 1000 includes altering each of the first bladder and the second bladder at 1020. Altering both bladders may include inflating both bladders, deflating both bladders, or inflating one bladder while deflating the other bladder. The altering of both the first bladder and second bladder may be performed at the same rate or at different rates. For example, the first bladder may be inflated at a higher or lower rate and/or to a higher or lower degree of inflation than the inflation of the second bladder. Likewise, the first bladder may be inflated at a higher or lower rate and/or to a higher or lower degree of inflation than the deflation of the second bladder. In still other examples, the inflation/deflation of the first bladder may be based on the inflation/deflation of the second bladder. For example, as the inflation of the first bladder is increased, the inflation of the second bladder may also be increased. In another example, as the inflation of the first bladder is increased, the inflation of the second bladder may be decreased. In alternate examples, the altering of the first and second bladder may be at rates that are independent of each other.

Returning to 1016, if conditions for the third mode are not met, then the method 1000 may proceed to 1022 maintain current engine operating parameters, which includes not altering either the first bladder or the second bladder. In other words, the first bladder and the second bladder may be maintained in their current states of inflation/deflation. The method 1000 may then exit.

In this way, a first bladder may be inflated to create a tumble or deflated to increase an airflow rate. Additionally, a second bladder may be located in the system and operated in coordination with the first bladder to provide synergistic benefits to air-fuel mixing. Further, the first bladder and the second bladder may exist at different degrees of inflation (e.g., the first bladder is 50% inflated while the second bladder is 25% inflated). The technical effect of altering the first bladder and the second bladder is to increase an air/fuel mixing and thereby, increase a fuel economy. Further, the first and second bladder may be used to maintain or alter an airflow rate to a desired airflow rate.

By inserting the first bladder through an opening of a bulkhead via a cartridge in an opening on a bottom surface of the intake runner nearest the cylinder, the bladder may be introduced in a compact design and be protected from thermal degradation. Additionally, the bladder may be adjusted based on sensed engine operations to optimize a fuel efficiency of each individual engine cylinder.

In one embodiment, a system comprises a cylinder with an intake port and a bladder positioned in an opening on a bottom surface of the intake port nearest the cylinder. The system, additionally or alternatively, further includes a controller programmed with computer readable instructions for inflating the bladder responsive to an operating condition. The operating condition includes inflating the bladder in response to an intake throttle being more closed. Additionally or alternatively, the bladder is coupled to a bladder manifold via a bladder inlet, and where the bladder manifold is coupled to an exterior wall of a cartridge. The cartridge, additionally or alternatively, is inserted into a bulkhead between the intake port and the cylinder, the cartridge further comprises a face with an exterior wall and an interior wall, the exterior wall is coupled to the bladder manifold, the interior wall is bound to a bulkhead seal physically adjoined to the bulkhead, a hollow, Y-shaped channel extending from the interior wall to the bladder, and where the channel is a single pathway housing the bladder inlet, the channel bifurcates to first and second identical bladders. Additionally or alternatively, the bulkhead seal prevents an engine coolant from leaking out the bulkhead, the engine coolant surrounding an outer portion of the hollow, Y-shaped channel, a coolant seal coupled to the bladder, and the bottom surface of the intake port. The system, additionally or alternatively, further includes further comprising a cartridge, wherein the cartridge includes a hollow, Y-shaped channel comprising a bladder inlet, and the bladder inlet furcates as the hollow, Y-shaped channel furcates within an interior passageway of a bulkhead. The cartridge is fastened to a bulkhead via a plurality of bolts, an interior wall of the cartridge is physically coupled to a bulkhead seal attached to an outer flange of a bulkhead seal opening. The bladder is inflated via a compressed air source.

An embodiment of a cylinder head system, comprising a cylinder head including an intake port above a bulkhead, the bulkhead fluidly communicating with a coolant passage. a cartridge inserted into the bulkhead and having an internal air passage sealed from the coolant by an extension member, and a bladder coupled to an end of the cartridge and fluidically coupled to the internal air passage. The cylinder head, additionally or alternatively, further includes the bulkhead being separated from the intake port via coolant passages and a coolant seal, and wherein the bulkhead is below the intake port, between the cylinder and a top of the cylinder head. The bladder, additionally or alternatively, is further coupled to the coolant seal coupled to the cartridge. The cylinder head, additionally or alternatively, further comprising two bladders per cylinder, one bladder in each intake port of the cylinder, the cylinder comprising two intake ports. The bladder is flush with the intake port bottommost wall when the bladder is deflated.

The cylinder head, additionally or alternatively, further comprising coolant flooding the bulkhead, the coolant delivered or removed by the coolant passage, the coolant in the bulkhead surrounding an exterior of the extension member and being isolated from the intake port via a coolant seal. The intake port, additionally or alternatively, is fluidically coupled to an intake manifold, the intake manifold is spaced from the cylinder head, and wherein the bladder manifold is located in the space between the intake manifold and the cylinder head.

An embodiment of a method, comprising adjusting each of a first variable bladder in a cylinder intake port and a second variable bladder in a intake manifold in response to a sensed vehicle operating parameter. The method, additionally or alternatively, further includes wherein the adjusting includes at least three modes, including, a first mode including inflating the first variable bladder without inflating the second variable bladder, a second mode include inflating the second variable bladder without inflating the first variable bladder, and a third mode including inflating both the first and second variable bladder. The adjusting the vehicle operation, additionally or alternatively, is based on one or more of a throttle position and engine load, the first, second, and third modes are mutually exclusive of one another.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising;
  adjusting, via compressed air from a compressed air source, each of a first variable bladder in a cylinder intake port and a second variable bladder in an intake manifold in response to a sensed vehicle operating parameter, the first variable bladder coupled in a cartridge that is inserted and positioned into an engine bulkhead between a cylinder and the cylinder intake port, the cartridge surrounded by coolant.
2. The method of claim 1, wherein the adjusting includes at least three modes, including:

a first mode including inflating the first variable bladder via the compressed air from the compressed air source without inflating the second variable bladder;

a second mode including inflating the second variable bladder via the compressed air from the compressed air source without inflating the first variable bladder; and a third mode including inflating both the first and second variable bladders via the compressed air from the compressed air source.

3. The method of claim 2, wherein the adjusting each of the first and second variable bladders is based on one or more of a throttle position and an engine load, and wherein the first, second, and third modes are mutually exclusive of one another.

* * * * *